TONE ACTUATED DICTATION SYSTEMS

Filed June 17, 1968 5 Sheets-Sheet 1

INVENTOR
THOMAS E. DOOLEY
BY D. Kendall Cooper
ATTORNEY

TONE ACTUATED DICTATION SYSTEMS

Filed June 17, 1968 5 Sheets-Sheet 3

TONE ACTUATED DICTATION SYSTEMS

Filed June 17, 1968 5 Sheets-Sheet 4

United States Patent Office 3,527,312
Patented Sept. 8, 1970

3,527,312

TONE ACTUATED DICTATION SYSTEMS

Thomas E. Dooley, Lexington, Ky., assignor to International Business Machines Corporation, Armonk, N.Y., a corporation of New York

Filed June 17, 1968, Ser. No. 737,643
Int. Cl. G11b *19/08, 31/00;* H04m *11/10*
U.S. Cl. 179—6 18 Claims

ABSTRACT OF THE DISCLOSURE

The invention concerns dictation systems having facilities for selectively connecting remote stations to a central recording unit, and recognizing control tones generated at a connected remote station to effect all operations require including recording and playback of audio (speech) signals. The systems feature optimized circuitry for controlling the forward and reverse stepping of a magnetic head in relation to a magnetic record media and the generation of various advisory and warning signals required.

CROSS REFERENCES TO RELATED PATENT APPLICATIONS

The following patent cases, assigned to the same assignee as the present case, are of interest:

U.S. Patent application Ser. No. 699,259 filed Jan. 19, 1968, entitled "Dictating and Transcribing Apparatus With Automatic and Semi-Automatic Operator-Controlled Facilities," with C. M. Fackler et al., as inventors.

U.S. patent application Ser. No. 737,762, filed concurrently herewith, entitled "Tone Elimination System," with M. P. Langendorf, C. L. Ridings, and W. H. Sebastian as inventors.

U.S. patent application Ser. No. 468,304 filed June 30, 1965, entitled "Tone Controlled Apparatus," with M. P. Langendorf, as inventor.

U. S. patent application Ser. No. 517,653, now Pat. No. 3,405,234, filed Dec. 30, 1965, entitled "Tone Circuits for Control and Data Signals," with L. E. West, as inventor.

U.S. patent application Ser. No. 737,642 filed concurrently herewith, entitled "Tone Actuated Dictation Systems With Voice Buffer Option," and having M. P. Langendorf and C. L. Ridings as inventors.

BACKGROUND OF INVENTION, INCLUDING FIELD AND PRIOR ART

Tone actuated dictation systems have been proposed heretofore. Prior systems of this nature are taught in the Langendorf Ser. No. 468,304 and West Ser. No. 517,653 applications referred to in the Cross Reference section. However, such systems have not contemplated optimized stepping and signaling circuitry as set forth herein.

SUMMARY OF INVENTION

Tone dictation systems according to the present invention have unique combined logic and related circuitry (including a multivibrator) for recognizing control tones to effect forward or reverse stepping of a magnetic head in relation to a magnetic media in one mode of operation and for establishing cyclical generation of advisory-warning signals in another mode of operation.

OBJECTS

Accordingly, an object of the present invention is to provide dictation systems controlled primarily in response to tone signals transmitted from remote stations to a central recorder.

Another object of the present invention is to provide optimized transducer movement circuits responsive to tone signals.

A further object of the invention is to provide combined transducer movement and advisory signal generating facilities for a tone dictation system.

The foregoing and other objects, features, and advantages of the invention will be apparent from the folowing more particular description of the preferred embodiment of the invention as illustrated in the accompanying drawings:

In the drawings:

FIG. 1*a* represents a public switched network for recognizing and handling requests for service from remote dictation stations and other telephone line conditions.

FIG. 1*b* illustrates a tone actuated central recording unit and related circuits.

FIG. 1*c* represents a voice buffer unit.

FIG. 1*d* shows an automatic selection network for handling connections and signals from public or private telephone stations.

PUBLIC SWITCHED NETWORK

FIGS. 1*a*, 1*b*, 1*c*, and 1*d* represent a variety of telephone and dictation components that are interconnected as illustrated in FIGS. 2, 3, 4, and 5 to form a number of tone actuated dictation systems.

Figures 1A, 2, 3:
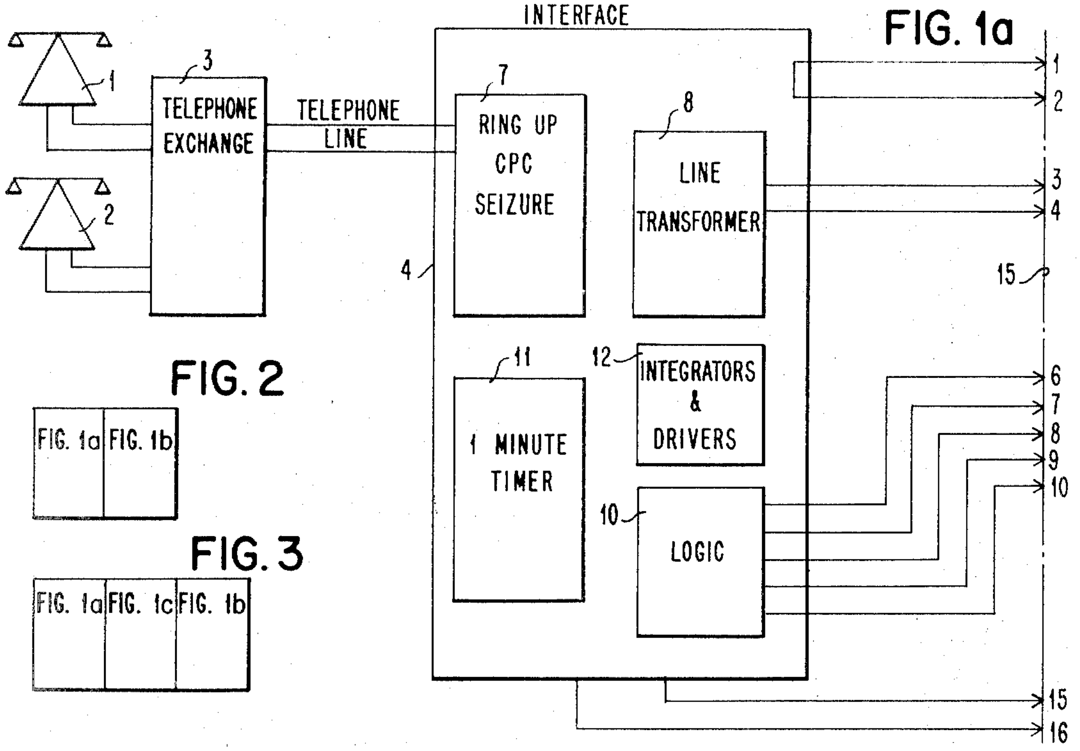
FIGS. 2, 3, 4, 5 illustrate four possible system configuration that make use of the circuits of FIGS. 1*a*–1*d*.

FIG. 1*a* is a diagram of a typical public switched network that responds to ringing signals, establishes appropriate connections and an audio path from a remote telephone handset to a central recording unit, as well as performing a number of other functions to be described. The network includes, as an example, two telephone handsets 1 and 2 that are assumed to be of the "Touch-Tone" (trademark, American Telephone and Telegraph Company) variety connected to a telephone exchange 3 and further connected to an interface network 4 that includes a number of circuit sections. Circuit 7 responds to ringing currents on the telephone line and establishes a connection through a seizure relay. The circuit also includes various elements concerned with calling party control (CPC). Line transformer 8 provides for DC isolation of the audio signals in order to maintain proper line balance. Logic circuit 10 determines whether the ring-up circuit 7 should respond to incoming calls as, for example, when the central recording unit is not in a ready status and further establishes disconnect of the system, when appropriate. The One-minute timer circuit 11 is primarily useful in establishing an automatic disconnect when the calling party's disconnect cannot be sensed. Circuit 12 includes integrators that translate the relay contact conditions in the ring-up circuit 7 to logic voltage levels, and drivers to furnish driving power for the relays. The various interconnections of the public switched network of FIG. 1*a* terminate along line 15 for connection directly along line 16 with the tone actuated recording unit of FIG. 1*b* as shown in FIG. 2 or along line 17 to the voice operated recorder (VOR) option and buffer unit shown in FIG.

1*c* and then by connections on lines 18 and 16 to the recording unit 1 when arranged as shown in FIG. 3.

TONE ACTUATED RECORDER UNIT

Figure 1B:
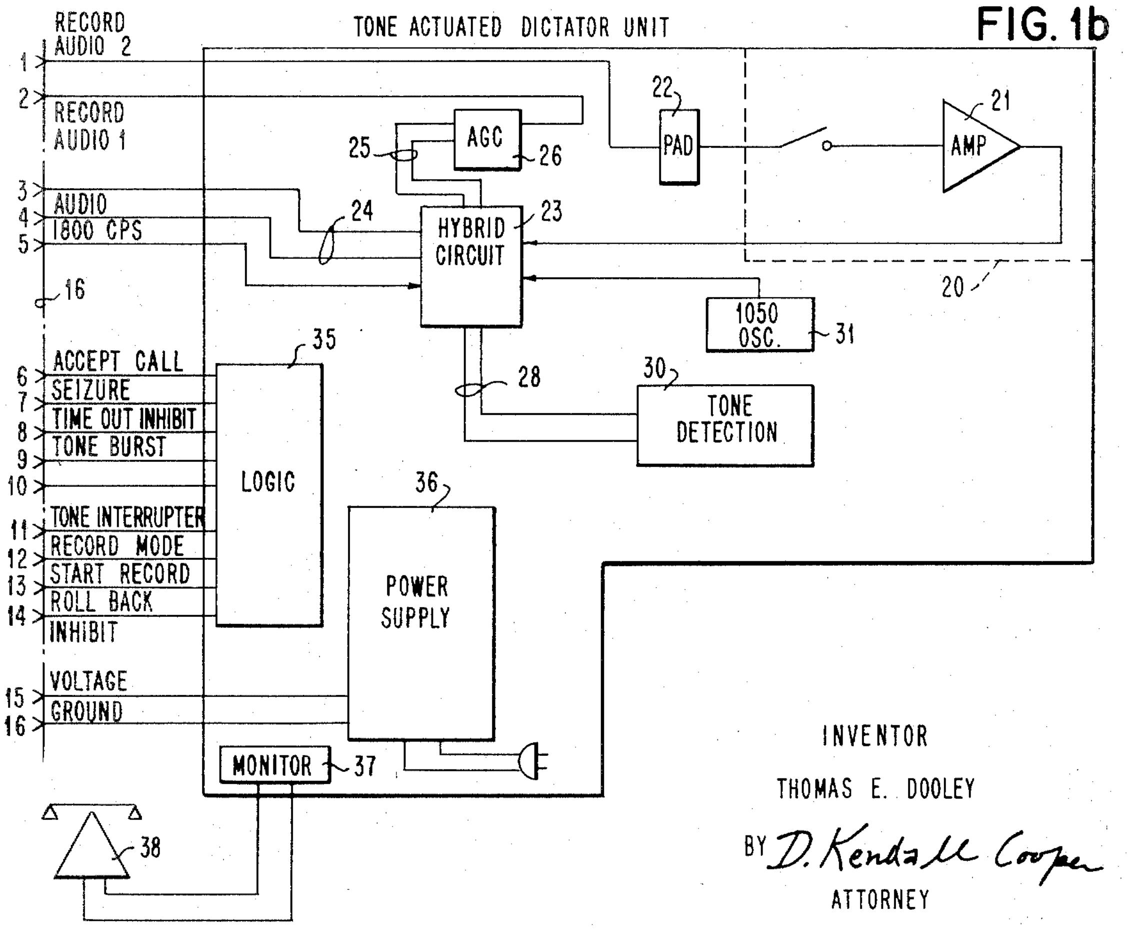

FIG. 1*b* is a schematic block diagram of a centrally located tone actuated recorder unit having various input and output terminations along line 16. The tone actuated recording assembly includes a recorder unit 20 having an amplifier 21 that may take a variety of forms and conveniently could be a magnetic belt type recording unit such as that fully described in the C. M. Fackler et al., patent application referred to in the Cross Reference section. An attenuation pad 22 provides proper voltage levels to the input of recording unit 20.

The central recording assembly further includes a hybrid circuit 23 similar to a four-wire terminating set, as commonly known in the telephone art. Reference is made to the handbook "Reference Data for Radio Engineers" for description of hybrid circuits. Primarily, a circuit of this type is intended to provide separation in order to prevent interference of outgoing audio signals with incoming audio control signals. A two-wire pair 24 accommodates audio signals both incoming and outgoing to the central recording unit. Incoming control signals and audio signals are provided by the two-wire pair 25 to the automatic gain control circuit (AGC) 26 that establishes a path for voice signals to be recorded in the recording unit 20. The path is through the VOR unit in the systems of FIGS. 3 and 5, but directly to the recording unit in the systems of FIGS. 2 and 4. Another two-wire pair 28 connects the hybrid circuit 23 to tone detection circuitry 30 that is more fully described later in the present case. Oscillator circuit 31 provides a 1050 hertz signal to the dictator indicative of the status of the recording unit at the central station. Logic circuit 35 provides a status recognition for the central recording assembly, proper sequencing of the actions required, and other control functions. The central assembly further includes a power supply 36. A monitor circuit 37 is connected to a local telephone handset 38 for attendant monitoring and conversation with the remotely located dictator. Audio from the handset is routed through the hybrid circuit 23 over the telephone lines. More than one central recording unit with appropriate selecting and connecting facilities can be provided, if desired in order to accommodate more than one dictator concurrently.

VOICE OPERATED RECORDER (VOR) OPTION OR BUFFER UNIT

Figure 1C:
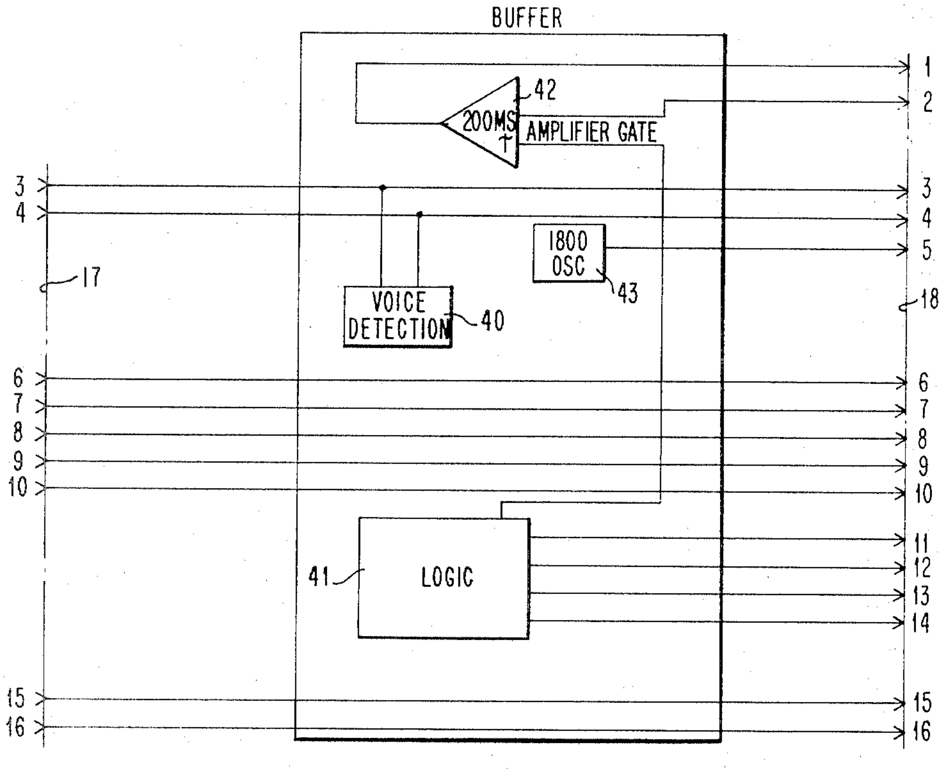

FIG. 1C illustrates in schematic form a buffer unit that is useful as an option in the systems described herein to establish automatic start-stop control of the central recording unit in response to the presence or absence of voice signals. The buffer unit includes a voice detention circuit 40, a logic circuit 41, a 200 millisecond delay circuit, and an 1800 hertz oscillator circuit 43.

Voice detection circuit 40 recognizes the presence of audio signals on the incoming telephone lines and provides indications of such presence to the logic circuit 41. Logic circuit 41 incorporates a means for determining the status of the central recording unit, particularly whether it is in the Record mode and responds to indications from voice detection circuit 40 to operate the driving means in the central recorder unit, starting and stopping the driving means, as appropriate, during dictation.

The delay unit 42, as known in the art, provides a suitable amount of delay of the audio signals to insure that the recording unit is actually up to proper speed before speech signals are recorded and that speech signals occurring during start-up time are not lost.

PRIVATELY WIRED TELEPHONES WITH AUTOMATIC SELECTION NETWORK

Dictators have access to the automatic selection network 45, FIG. 1*d*, and subsequently to the tone actuated dictation machine from either privately wired telephones 46 and 47 or through the public switched network to the public line interface 48. Logic 50 located in the automatic selection network controls which dictating machine is to be accessed and routes the audio from any telephone or public line interface that has requested connection to that dictating machine. The interface to the privately wired telephones is by way of transformer and off-hook detection networks 51 and 52. The off-hook detection networks detect the fact that a dictator has removed the handset from the cradle of the telephone. The transformer in each network provides audio coupling to the tone actuated dictating machine. Power is supplied to the appropriate telephones when they are moved off hook. Logic 50 controls whether or not public line interface 48 accepts a call and allows a connection to be made. The audio for the public line interface is also routed from the connected telephones to the dictating machine that is chosen by the logic. The logic functions includes that of determining the proper seizure of recorders in order to accomplish equal use time. Routing circuit 55 interlocks all inputs, whether public line interface or privately wired telephones, and provides driving for reed relays to establish audio paths.

RECORDER LOGIC AND FUNCTIONAL DIAGRAM

Figure 6:
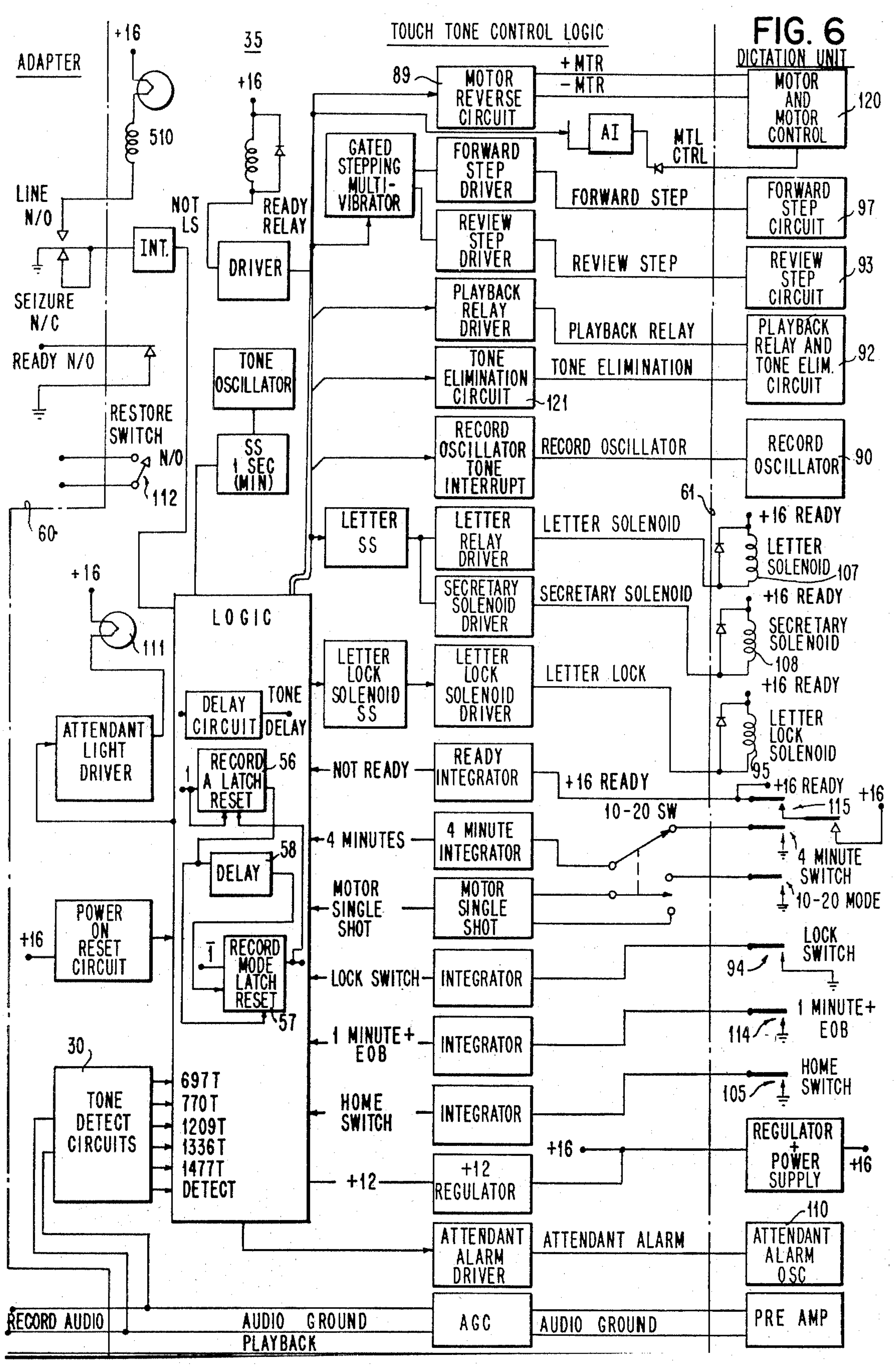
FIG. 6 is a more detailed version of certain logic and control facilities associated with the recorder unit in FIG. 1*b*.

FIG. 6 illustrates various logic more directly associated with the central recording unit and shows a portion of the adapter circuitry to the left of line 60, the Touch-tone control and operational logic, and various structures incorporated in the dictation unit itself to the right of line 61. The Touch-tone control logic area includes tone detection circuits 30, a number of driver circuits for driving various relays and solenoids in the dictation unit, as well as alarm devices at the central station and integrator circuits associated with certain switch mechanisms. The various operating elements and circuit blocks will be discussed in greater detail in later sections.

FREQUENCY DETECTION NETWORK

Figures 7, 8:
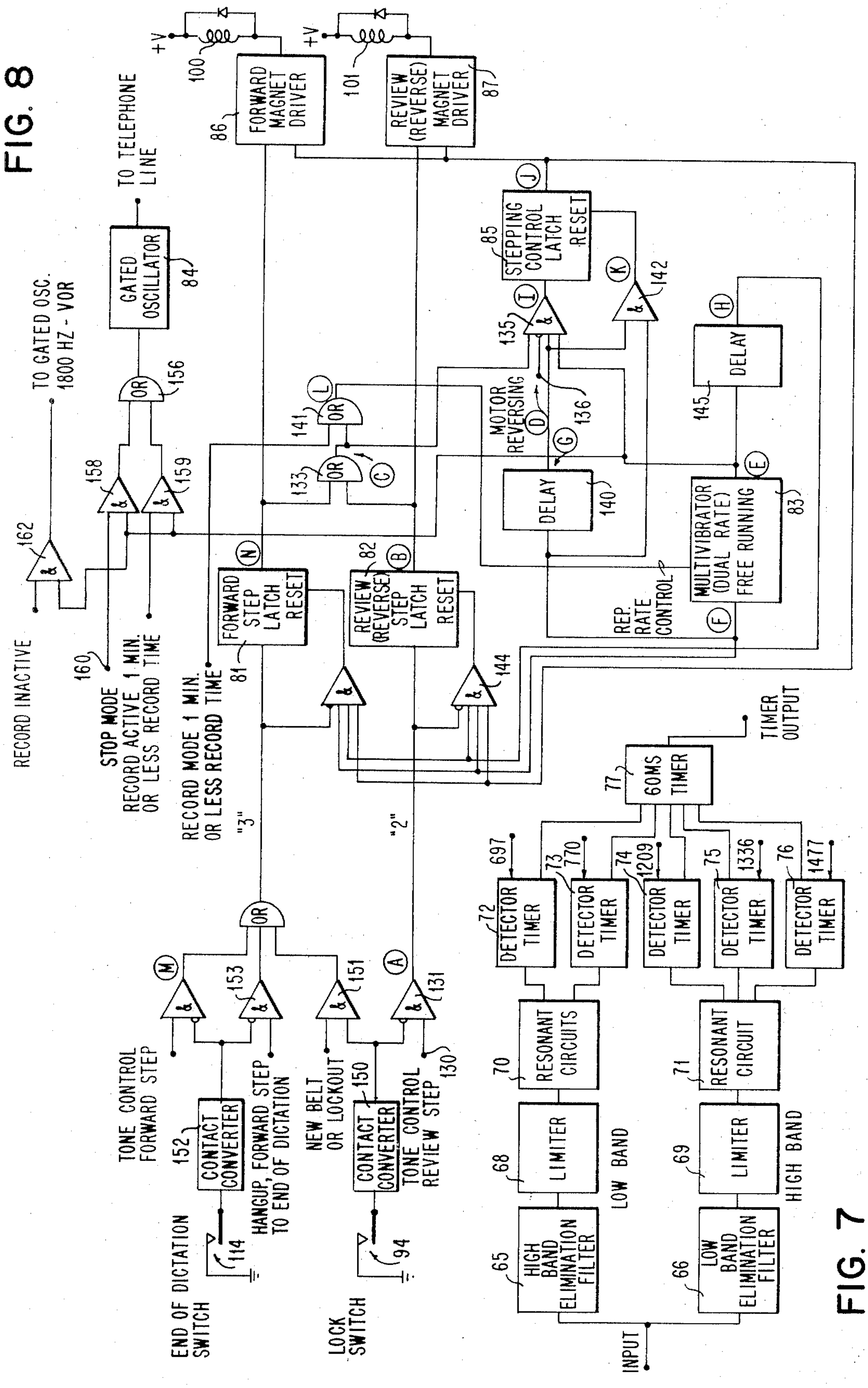
FIG. 7 shows a suggested form of tone recognition (detection) circuitry also associated with the central recorder unit of FIG. 1*b*.
FIG. 8 illustrates a combined forward and reverse stepping/tone generation circuit according to the present invention.

FIG. 7 illustrates various circuits involved in detection of the tones encountered during operation of the dictation system. These are detailed versions of circuits included in block 30, FIG. 6.

For purposes of illustration, it is assumed that the Touch-tone keyboard on a telephone is arranged in a 4 x 3 matrix with a low band tone associated with a low and high band tone associated with a column. For the present system, only the first six buttons on the telephone are used which involves two frequencies in the low band and three frequencies in the high band. The low band frequencies are 697 Hz. and 770 Hz. and the high band frequencies are 1209 Hz., 1336 Hz., and 1477 Hz. The detection scheme shown in block diagram form in FIG. 7 separates the frequencies into the respective bands by using band elimination filters 65 and 66 to filter out the unwanted frequency. The outputs of the band elimination filters are fed into respective limiter circuits 68, 69 which generate a constant amplitude square wave at the frequency of the incoming sine wave. The square wave is used to drive series resonant tank circuits 70, 71 which are tuned to the center frequency of the tones present in that band. As the input frequency of the square wave approaches the resonant frequency of a tank circuit, the current through the circuit will increase. When the current reaches a certain threshold value, the related detector-timer circuit 72–76 gives an output. This threshold is related to the percentage deviation of the input frequency with respect to the resonant frequency of the tank circuit. A detector will give an output when the incoming frequency is within a selected range about the resonant frequency and will not give an output when the incoming frequency is greater than a somewhat wider range about the resonant frequency. The detector output will be in the form of pulses which have a period of the incoming frequency. Each detector output is fed into a timer which supplies an output when the string of input pulses is continuous.

The outputs of the five resonant timers are fed into a 60 ms. timer 77 which requires that two frequencies be present simultaneously, one from each band, for a period of 60 ms. in order to get an output. When the 60 ms. timer output comes up the tones that are being detected are considered to be valid tones and are used to perform a particular machine function.

MULTIVIBRATOR CONTROL CIRCUIT

FIG. 8 illustrates a multivibrator control circuit that is incorporated in the logic block of FIG. 6 and that is useful during operation of the present system, particularly in connection with the control of the forward and reverse stepping of the magnetic head in relation to the magnetic belt record media and also in connection with the timed or pulsed generation of signals that inform the dictator of various conditions in the system while he is connected to it. The circuit of FIG. 8 includes logic for indicating the present status of the system and for taking into account conditions that may arise including the control tones received from the dictator and signals developed within the central recorder indicative of its status in various respects. The circuit includes a forward step latch 81, a review (reverse) step latch 82, a free-running multivibrator circuit 83, a gated oscillator circuit 84, a stepping control latch 85, a forward magnet driver 86 and forward solenoid 100, and a review (reverse) magnet driver 87 and reverse solenoid 101, together with And and Or circuits for effecting the necessary control.

STEPPING CONTROL DIAGRAMS

Figure 9:
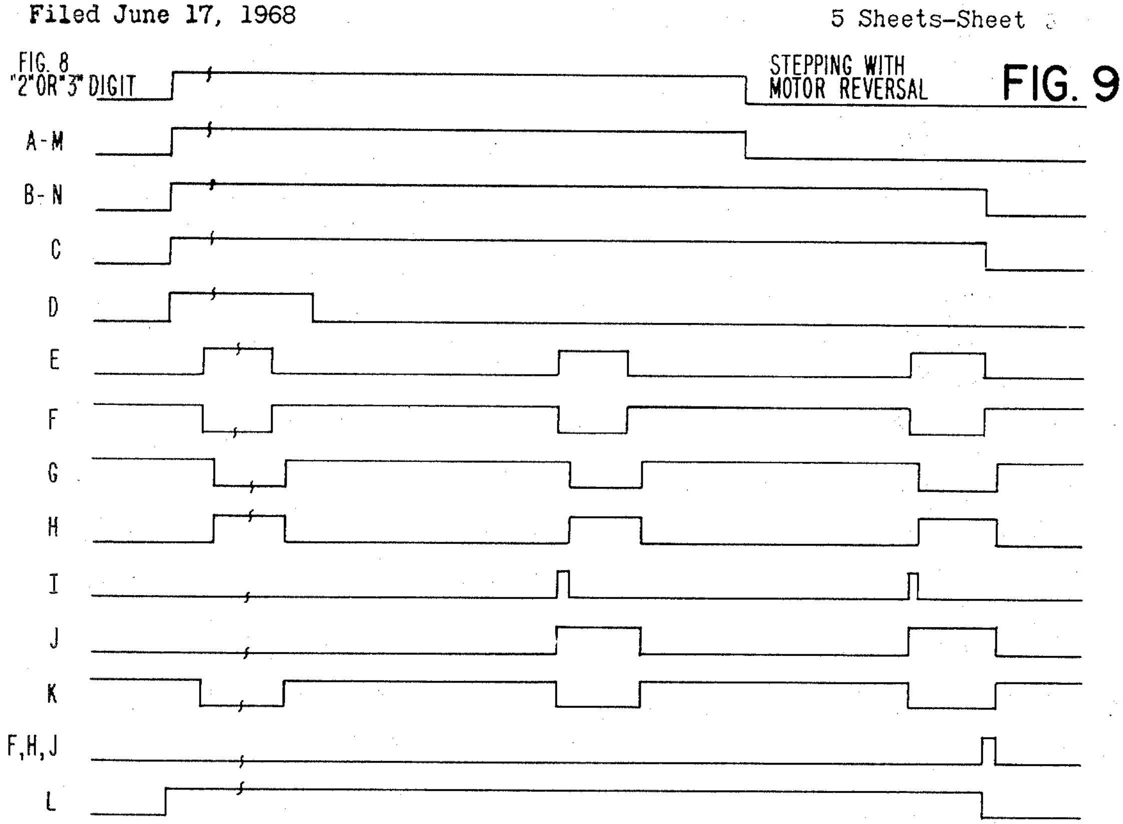
FIGS. 9 and 10 illustrate stepping situations with and without motor reversal.
Figure 10:
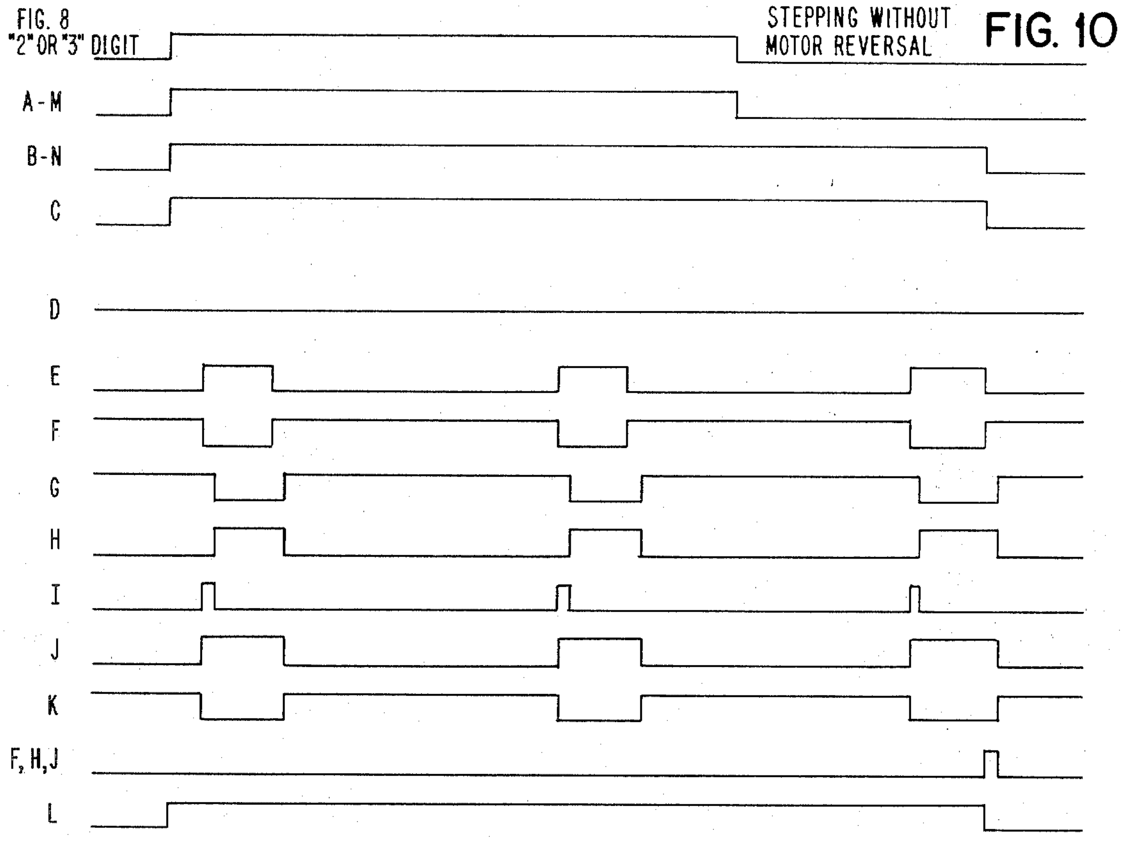

FIGS. 9 and 10 illustrate a number of stepping control situations encountered in the system.

PUBLIC SWITCHED NETWORK SYSTEM

FIG. 2 indicates that a public switched network dictation system is established by interconnecting the public switched circuitry of FIG. 1*a* directly to the tone actuated dictator unit of FIG. 1*b*.

With this system configuration, a user at one of the telephone handsets 1 or 2 gains connection through the telephone exchange 3 and the interface circuitry and by means of the connections along lines 15 and 16 to the central recording unit 20 and is able to control all of the various operations required in connection with dictation such as recording, playback, stepping, etc. The tone detection circuitry of FIG. 7 is active in the system of this nature for monitoring and detecting the various tone combinations in order to effect controls desired.

PUBLIC SWITCHED NETWORK WITH VOR OPTION

FIG. 3 illustrates the circuit arrangement necessary to establish a VOR option in connection with the public network system. This arrangement requires that the interface circuitry of FIG. 1*a* be connected into the inputs of the VOR buffer circuit of FIG. 1*c* along lines 15 and 17 and thence along lines 18 and 16 through the inputs of the tone actuated central dictation unit in FIG. 1*b*.

With the VOR option, the starting and stopping of the dictation unit is primarily effected by detection of audio signals encountered when the dictator is speaking. The buffer will also start when control tones are detected but as is discussed in the Langendorf case Ser. No. 737,642, such start up of the buffer unit is ineffective to record such tones on the central recording media. A brief reference to this feature is also made later herein.

AUTOMATIC SELECTION NETWORK SYSTEM

Figures 1D, 4, 5:
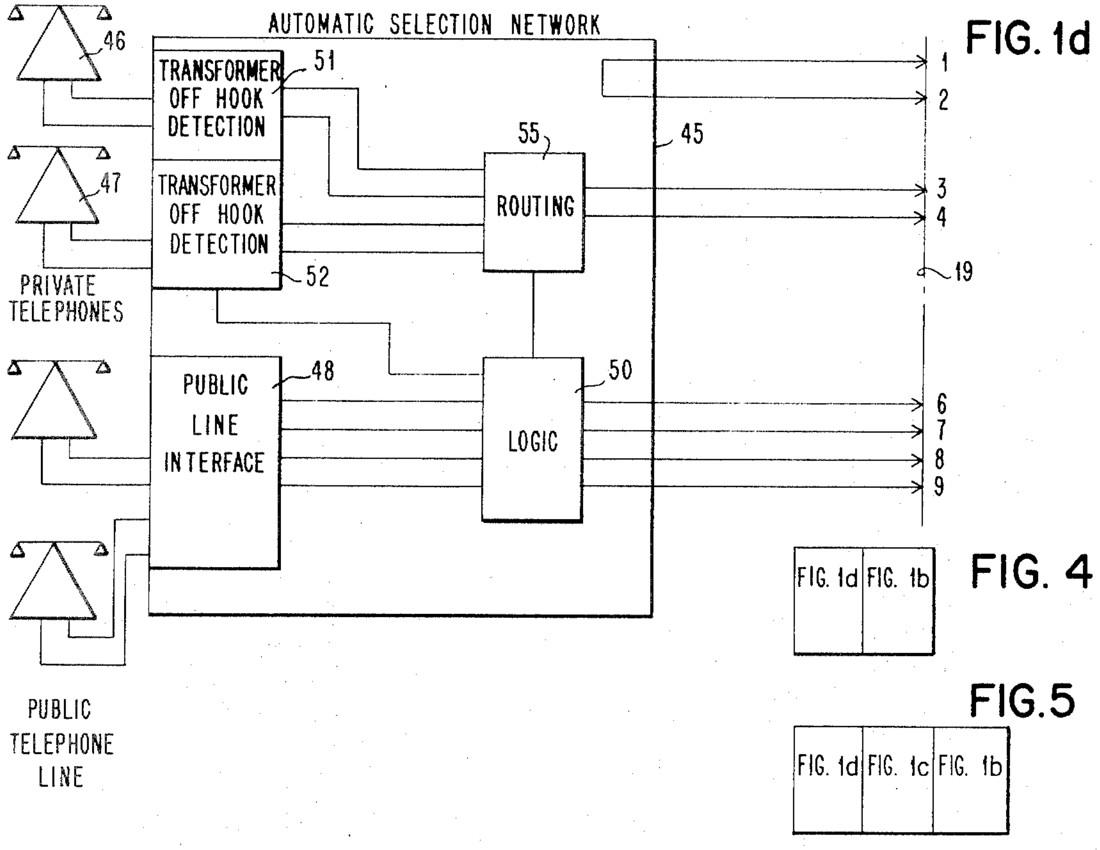

The automatic selection network system includes the circuitry shown in FIG. 1*d* connected along lines 19 and 16 to the central recording unit of FIG. 1*b*, arranged as in FIG. 4. In this case, the automatic selection network permits the connection of either private telephone handsets or public telephone handsets to the central recorder for dictation purposes and control purposes. It is assumed of course that the telephone handsets involved in either case, whether private or public, will have the necessary tone generating structures. Once the connections are established in this system configuration, the recording and playback of material, the generation of tones and their recognition, as well as the necessary controls occur in a manner quite similar to the public switched network system discussed in connection with FIG. 2.

AUTOMATIC SELECTION NETWORK WITH VOR OPTION

FIG. 5 illustrates the necessary circuit connections for the networks shown in FIGS. 1*d*, 1*c*, and 1*b* in order to establish an automatic selection network with VOR option. In this case, the circuits of FIG. 1*d* are connected as inputs to the buffer unit of FIG. 1*c*, along lines 19, 17, the buffer outputs then being directed by connection on lines 18 and 16 to the dictation unit in FIG. 1*b*. A system of this nature has characteristics that are similar to that previously discussed in connection with the public switched network with VOR option.

OPERATIONAL DESCRIPTION

Telephone line control

Operation of the system is described in connection with the configuration of FIG. 2 involving FIGS. 1*a* and 1*b*, and in some cases, the VOR configuration of FIG. 3, involving FIGS. 1*a*, 1*c*, and 1*b*. Also, reference is made to FIG. 6.

Interface 4, FIG. 1*a*, automatically answers an incoming call provided the system is in a Ready mode. The Ready mode is defined as power on, belt loaded and phased (see Fackler et al. application), and more than four minutes of recording time left on the belt. If one of the above conditions is not satisfied, interface 4 and the caller will hear a repeated ringing signal.

When a call is answered, interface 4 gives a signal to the recorder that the connection is made. Depending on the telephone facilities available, this signal may also indicate when the user has hung up. If this feature is available, or if the system has the VOR feature, the recorder will automatically go to the Record mode when the connection is established. The recorder may then be used as a message recorder when the user is calling from a non-Touch-tone area.

For those cases, where interface 4 does not indicate a hang up, and there is no VOR, the recorder will be in the Stop mode when the connection is established. Maintenance of the connection is controlled by a one minute timer. When the recorder (with VOR) is in the Stop mode (or in the Record mode without being actuated by voice) for a period of one minute, the connection is broken by the interface. At this occurrence, the user will hear a one second 1050 Hz. tone, and will not be able to prevent a disconnect.

Feedback tones

The user hears an interrupted 1050 Hz. Stop (Standby) tone in the Stop mode. The VOR feature provides an interrupted "talk-down" tone (1800 Hz.) when the recorder is in the Record mode. This tone is cut off when the user's voice is detected. Once voice is detected, the "talk-down" does not come back for approximately two seconds (1–4 seconds), since it is a direct indication that the recorder is in a recording status. Either the talk-down tone or Stop tone is an indication that the one minute timer is actively timing out (in those telephone systems that require a time out facility.)

A tone of the same frequency as the Stop tone but interrupted at a higher rate is heard by the user when the recorder is in a Record mode and there is one minute or less recording time remaining on the belt (i.e. one minute measured in ten minute mode.)

Touch-tone control

Keybuttons 1–6 on the touch-tone pad are used to control the recorder. The touch-tone keyboard is a 4 x 3 matrix with a low band tone associated with a low and high band tone associated with a column. For the various systems only the first six (6) buttons on the telephone are used. This includes two frequencies in the low band and three in the high band. The low band frequencies are 697 and 770 Hz., and the high band frequencies are 1209, 1336 and 1477 Hz.

(*a*) *Digit "1."*—Depression of the "1" key on the connected telephone handset 1 or 2 while the recorder is in the Stop mode effects a transition to the Record mode. Without the VOR, the recorder is then in a Record status. With VOR, the user hears a talk-down tone and recording space on the belt is not used until the user begins to speak. At this time his voice is detected in the VOR option of FIG. 1*c*. This causes the recorder to actually begin recording. A buffer in the VOR allows for a finite time for voice detection and starting time for the motor in the dictation unit 20 so there is no loss of the user's dictation.

When the Record mode or the Playback mode and the "1" key is depressed, the recorder will go to the Stop mode. Since the control tones are audio signals and there is a delay associated with tone detection, the tones are also recorded in the VOR buffer (or on the belt when the feature is not in the system). The time delay in the buffer is used to prevent the tones from being recorded in the central recorder 20. This is accomplished due to the fact that as the tones are detected, no further transfer from the buffer to the recorder is allowed. When the VOR is not in the system, control tones are erased from the recorder belt by reversing the motor by circuit 89 with the record oscillator 90, FIG. 6, on, as described in the Langendorf application Ser. No. 737,762. This motor reverse and tone elimination sequence is effective whenever the recorder is in the Record mode and any digit is received.

The "1" digit is recognized to establish either a Record or Stop function to insure the transfer from the Playback mode to the Record mode does not result from a miskeying of the touchtone phone. This prevents accidental erasure of previous dictation.

(*b*) *Digit "2."*—Depression of the "2" key causes the recorder to go to the Playback mode by actuating relay circuit 92 and backstep by actuating review circuit 93, FIG. 6. Circuit 93 includes latch 82, driver 87, and solenoid 101, FIG. 8. The recorder has automatic stepping which is actuated at the rate of from 3–5 steps per second (nominal) while the "2" key is depressed. A "letter end" lockout mechanism, including lock switch 94 and solenoid 95, FIG. 6, prevents a backstep into a prior user's dictation.

When the "2" key is actuated while the recorder is in the Record mode (without VOR) the backstep takes place after the motor has reversed to erase the control tones. Since no motor reversal is required when the "2" key is actuated while the recorder is in the Stop mode, it becomes difficult for a user to time the "2" key actuation to get a single backstep. The logic therefore causes at least one backstep for any detectable "2" key actuation whether or not there is a motor reverse sequence.

(*c*) *Digit "3."*—Depression of the "3" key causes the recorder to go to the Playback mode and forward step under control of circuits 92 and 97, FIG. 6. Circuit 97 includes latch 81, driver 86 and solenoid 100, FIG. 8. The characteristics of forward stepping are the same as backstepping except the forward travel is limited to the previously recorded area of the belt. This is controlled by the "home" switch 105 (Review-Playout contact), FIG. 6. Home contact 105 moves forward with the soundhead only when the recorder is in Record mode. To insure that the user can playback previous dictation, the Home contact kicks forward on each backspace sequence approximately .025 inch. This is required as the position of the Home contact may be as much as one belt revolution displaced from the end of dictation after a stepping operation.

(*d*) *Digit "4."*—Depression of the "4" key causes a letter mark to be placed on the index slip (see Fackler et al., application) and transfers the recorder to the Stop mode. The time for which the marking solenoid 107 is actuated is controlled by the logic and is not affected by the duration of the "4" key actuation.

(*e*) *Digit "5."*—Depression of the "5" key causes a secretary mark to be placed on the index slip by actuation of solenoid 108 and transfers the recorder to the Stop mode. The actuation time is again controlled by the logic.

(*f*) *Digit "6."*—The "6" key is used as an attendant call signal. An audible alarm 110 is activated for the duration of the key depression and the attendant light 111 comes on, and remains on until another key is pressed or a disconnect occurs. The "6" key also causes the recorder to go to the Stop mode and each key depression resets the one minute timer 11. There is, therefore, no requirement that the attendant achknowledge the user within one minute to prevent a disconnect.

Interrupt

The attendant may interrupt to allow communication with the user via the attendant phone 33, FIG. 1*b*, either by choice or in answer to the attendant alarm. Actuation of the Interrupt switch causes the following:

(a) Transfers recorder to the Stop mode.
(b) Inhibits the one minute time-out disconnect operation.
(c) Provides power to the attendant phone to allow two way conversation.
(d) Allows the attendant to replace the belt without causing a disconnect.

The recorder remains in the interrupted condition until the attendant actuates Restore switch 112. The user then hears an interrupted Stop tone when the recorder has been restored.

VISUAL AUDIO INDICATORS

| Machine status | In use lite | Attendant lite | Attendant buzzer | Day/nite switch |
|---|---|---|---|---|
| Not seized ready | Off | Off | Off | |
| Seized | On | Off | Off | |
| Attendant | On | On | On | |
| Call | On | On | Off | |
| Interrupted | Off | On | Off | Day. |
| Interrupted or not seized and 4 minute zone. | Off | On | Off | Nite. |
| Not seized and 4 minute zone. | Off | On | On | Day. |

Disconnect sequence and belt changes

When the interface indicates that the connection has been broken, the recorder forward steps to the Home contact 105. The Letter Lock mechanism has been released by solenoid 95 under control of the machine logic and moves forward to the Home contact position. At this point, a letter mark is placed on the index slip by actuating solenoid 107. The Lock switch on the Letter Lock mechanism is closed at this time and the recorder again forward steps one or two times until Lock switch 94 opens. This operation is made to insure that the next user will be able to play back the first words of his dictation since the Lock switch prevents backstepping into a previous user's dictation.

The recorder is now ready to accept the next call providing there is more than 4 minutes of dictation left on the belt as indicated by switch 115. If there is less than 4 minutes left, the recorder indicates this to interface 4 and the interface will not answer. Also, the attendant lamp 111 and buzzer (see table, Day/Night Switch) comes on at the recorder to indicate to the attendant that a belt change is required. Upon dialing the number, the caller hears the ringing signal as an indication of this condition.

Contacts 114 indicate one minute of recording time left on the belt and end of belt condition that necessitate changing the belt.

When the attendant does change the belt and the recorder has phased properly, the Lock switch will be closed. One or two forward steps are required to open the switch. This again insures that the first user will be able to play back his first word of dictation. When Lock switch 94 opens, the recorder is ready to accept the call and indicates this to the interface. A belt change during interrupt is the same except that Restore is inhibited until the belt is phased and Lock switch 94 opens.

Motor reverse control

As described in the Langendorf et al. case Ser. No. 737,762, the control tones are erased from the belt under control of circuit 120 by a motor reversal when the recorder is transferred from the Record mode to the Stop or Playback mode. The record time of the tones is determined by the tone circuitry 30. A switch, not shown, but linked to the drive by a slip clutch is opened when the motor drives forward. A digit received by the recorder in the Record mode causes the motor voltage to be reversed to circuit 89. The motor accelerates in the reverse direction engaging the slip clutch. When the drive has travelled the pre-set distance as determined by the switch closure, the motor voltage is again reversed. The motor is dynamically braked and accelerates in a forward direction until the switch opens, at which time either normal forward speed voltage is applied for Playback mode or no voltage for Stop mode. During the reversal, the record oscillator 90 is kept on in order to erase the control tones.

Audio

The bi-directional audio path of the telephone line is split into two uni-directional paths in the recorder by hybrid circuit 23, FIG. 1*b*. The audio input path connects to the AGC circuit 26 and the Tone detection circuitry 30 in parallel, while the audio output path connects to the amplifier 21. The electrical separation of the uni-directional paths provided by the hybrid circuit is inherently limited by the ability (or inability) to match the impedance of randomly selected telephone lines. The amount of separation affects the capability of the tone detect circuit when the recorder is in the Playback mode; however, speech pauses are generally sufficient to allow adequate tone control in the worst case. Separation also determines the degree to which a feedback tone present in the last minute of recording time is recorded.

The purpose of AGC circuit 26 is to maintain the recording level at reasonable limits when there are variations of input levels due to the ability of the system to handle calls on local as well as long distance connections. There is no AGC for the tone detection circuit.

Multivibrator control of stepping and tone generation in the system

As indicated in the operational description set forth above, the central recorder unit, FIG. 1*b*, has facilities and structures for effecting a reverse stepping or a forward stepping of the magnetic head in relation to the magnetic belt record media. In essence, depression of the "2" key at the telephone handset establishes conditions for back-stepping the magnetic head in relation to the belt by actuating solenoid 101, FIG. 8, while depression of the "3" key at the telephone handset sets up conditions for a forward step of the magnetic head in relation to the belt by actuating solenoid 100, FIG. 8. Also, a number of signals are provided for in the system. As an example, the 1050 Hz. tone indicates to the user that the system is in a Stop mode. The 1800 Hz. tone indicates to the user that the system is in a Record mode and ready for him to speak. When the central recording unit 20 reaches a position on the magnetic belt that is one minute from the end, switch 114, FIG. 6, closes, and another 1050 Hz. tone having a more rapid repetition rate is generated by the system to so indicate.

In accordance with a novel aspect of the present invention, the control of stepping in the system and the generation of the pulse tones required is performed by the multivibrator control circuits of FIG. 8.

Depression of "2" key and backstep operation

In order to accomplish a backstep operation, the dictator depresses the "2" key on the telephone from which he is dictating. When the tones associated with the digit "2" are received, tone detection network 30 will give an output indicating this digit to the logic at terminal 130 of And circuit 131, FIG. 8.

Reference is made to FIG. 9 which shows the stepping operation when motor reversal is necessary to eliminate a control tone from the belt as discussed in the Langendorf et al. case Ser. No. 737,762. The designations A–L refer to circuit points in FIG. 8. Upon receipt of the digit "2" in the logic from the tone detection circuitry at terminal 130. The output of the And circuit 131 (point A) will go to an up level if lock contact 94 is not made. This in turn sets the output of the Review step latch 82 (point B) to an up level. The signal at point B is fed into Or circuit 133, the output of which (point C) goes to an up level. This is one of the conditioning legs on And circuit 135 which controls setting of the Stepping control latch 85. The output of Or circuit 133 is also fed into Or circuit 141, the output of which at point L increases the repetition rate of the multivibrator 83. This is done by varying the feedback capacitance in the multivibrator circuit by placing another resistor in parallel with the normal resistor in the RC timing circuit in order to decrease the RC time constant. This increases the rate of stepping. On the receipt of the "2" digit and if the machine has been in a Record mode, a motor reversing sequence is begun to eliminate the tone on the belt as described in the Langendorf et al., application. After the conclusion of the motor reversing sequence, the signal at point D will fall. Therefore, whenever the multivibrator "1" output at point E goes to an up level and the delay "0" output at point G remains at an up level for the delay time, the And conditions will be satisfied and point I will go to an up level to set Stepping control latch 85. Since point J is now at an up level and point B is at an up level, the Review magnet driver 87 is energized. The review magnet solenoid 101 is energized as long as point J is at an up level and point B is at an up level. The reset of the Stepping control latch 85 is under the control of the signal level at point K. And circuit 142 is conditioned by the "0" output of the multivibrator at point F and the delay circuit ouput from point G which occurs a delay time after the multivibrator pulsing time. If the "2" digit signal is still present at the Review step latch 82 reset time (as described below), it will remain set and the sequence will again occur in order to accomplish another step at the next multivibrator time. This sequence will take place as long as the "2" digit is received. When the "2" digit disappears, the resetting of Review latch 82 will take place from And circuit 144 which has as its input the signals from the Stepping control latch (point J), the output of the delay circuit 145 from the "1" output of the multivibrator (point H) and the output of the "0" side of the multivibrator (point F). This time period occurs at the very last portion of the multivibrator pusing time such that a full time is given to Review magnet driver 87 to accomplish a proper stepping operation.

On the receipt of the "3" digit and if the machine is in the Record mode, forward stepping occurs in the same manner as upon receipt of the "2" digit with the exception that the And, Or and other circuits associated with the "3" digit and forward stepping are active, such as at points M and N, instead of those associated with the "2" digit.

Multivibrator control of stepping without motor reversal

FIG. 10 illustrates the timing sequences and signals encountered in the circuit of FIG. 8 when the "2" digit for backstepping or the "3" digit for forward stepping are encountered in the system, but no motor reversal is required. This occurs, as an example, when the system is in a Playback mode rather than a Record mode. The conditions depicted in FIG. 10 are also applicable in the event of a hangup by the dictator at some distance back from the farthest point of advance and when, under such circumstances, it is necessary to forward step the magnetic head to the end of the previously dictated material.

In the event a "2" digit is received which would ordinarily cause backstepping and the dictator is at the very beginning of his dictated material and encounters the lockout switch, such case establishes conditions for the lockout switch to inhibit further backstepping through the contact converter circuit 150 and associated And circuit 131 shown in FIG. 8.

Switch 94, converter circuit 150, and And circuit 151 provide for one or two automatic forward steps when a belt change has been completed primarily to establish a guard zone between successive dictators and at the very beginning of the belt. Initial recording on the belt then actually starts one or two tracks in from the margin.

In the event of a hangup condition, it is necessary for the apparatus to be forward stepped, and this is done automatically under control of the logic in the system, rather than under control of a "3" digit, as would ordinarily be the case. The forward stepping continues until the forward advance or end of dictation switch 114 is encountered at which time the end of dictation switch inhibits the forward stepping through the associated contact converter circuit 152 and And circuit 153 shown in FIG. 8. However, upon such occurrence, the letter end lockout mechanism is released, and thereupon assumes a new position to define the end of this dictation material and the beginning of the dictation material of the subsequent dictator.

While the system is connected to the dictator station, reverse or backstepping under control of the "2" digit and forward stepping under control of the "3" digit occurs in a manner very similar to that described in connection with FIG. 9 with the exception that no motor reversing is necessary, since no tones are being recorded on the magnetic belt record media at the central recording unit. Under such condition, the motor reversing inhibit input at point D in FIG. 8 is not active and the Stepping control latch 85 is set immediately to control the stepping of the Review magnet driver 87 or the Forward magnet driver 86, as appropriate, rather than waiting for the motor reversing and tone erasure to take place as described previously in connection with FIG. 9.

Multivibrator control of tone generation

The multivibrator control circuit of FIG. 8 proves useful for the control of the generation of the various warning tones in the system including the 1050 Hz. tone provided during a Stop mode and the 1800 Hz. tone (talk-down) tone generated when the system is in a Record mode, but the dictator is not speaking. A 1050 Hz. tone is also generated during the last one minute interval on the belt to warn the dictator that the end of the belt is approaching. However, the periodicity of this tone is at a higher rate than ordinarily provided during the Stop mode. That is, the multivibrator rate is increased so that the tone occurs at a more rapid rate that is about twice that of the same 1050 Hz. tone during a Stop mode. In the event that the system configuration having the VOR buffer is used and a plurality of central recorders are provided so that a number of remotely located dictating stations are connected concurrently with different recording units, it may happen that tones occurring at one rate such as the talk-down tone (a relatively slower rate) are required for one dictator, while tones at a different rate (a relatively higher rate) are required to indicate the end of belt for another dictator. In such case, a multivibrator circuit comparable to that shown in FIG. 8 would be provided for each recorder, each operable in an independent fashion to provide the appropriate slower or faster repetition rates required.

The first tone encountered during operation of the system is the 1050 Hz. tone that indicates a Stop mode to the dictator upon being connected to the central recording unit. The gated oscillator 84 is gated to on condition by the output of the Or circuit 156. Or circuit 156 has two inputs, each of them being from an And circuit. Gating one of the And circuits 158 is a Stop mode signal at terminal 160 indicating that the machine is in the Stop mode and also the output from the true side of the free running multivibrator (point E). While the machine is in the Stop mode, the repetition rate control (point L) is down, causing the multivibrator 83 to run at a slower rate.

Likewise, when in the Record Inactive mode, And circuit 162 is gated on by the multivibrator output E. The output of And circuit 162 controls the gated oscillator in the VOR circuit which generates the talk-down tone. If the VOR option is not available, and the machine is in the Record mode, it runs continuously and there is no talk-down tone. When there is one minute of less recording time on the belt, the multivibrator 83 operates at the higher repetition rate as controlled by Or circuit 141, and And circuit 159 activates gated oscillator 84 to so advise the dictator. In the Record Inactive mode with VOR, the talk-down tone is transmitted interrupted at the higher rate. In the Record Active mode (or Record mode without VOR) the Stop tone is transmitted at the higher rate.

Control tone conditions and handling with VOR option

Reference is made to the Langendorf et al., case Ser. No. 737,642 for a description of a number of control tone conditions encountered when the system is equipped with the VOR option as previously discussed in connection with FIGS. 3 and 5. These include the condition where the dictator has finished speaking and then activates a control button to take the machine out of the Record mode, a situation in which the dictator is speaking at the time he initiates a control tone from a button that will take the machine out of the record mode, and a situation where the machine is in a Stop mode and the control signal is received in order to place it in the Record mode. The logic is such that the amplifier to the input of the buffer is not gated on until the machine is actually placed in a Record mode. This occurs at the termination of the control tone which is being received. Therefore, none of the control tone is placed onto the buffer and none of it will be placed on the belt in the recorder. The logic in FIG. 6 includes a Record A latch 56 and a Record mode latch 57. The Record A latch is set upon occurrence of the control tone "1." The output of this latch through Delay circuit 58, together with a Not "1" condition is effective to set the Record mode latch 57 upon termination of the control tone "1" signal.

While the invention has been particularly shown and described with reference to several preferred embodiments, it will be understood by those skilled in the art that various changes in form and detail may be made without departure from the spirit and scope of the invention.

What is claimed is:

1. A control arrangement for a telecommunication dictation system, comprising:

a recording unit with provision for accommodating record media and having a transducer;

means for effecting relative movement between said media and said transducer as a particular cyclical rate;

means for generating advisory signals at said cyclical rate;

common cyclical control means for establishing said cyclical rate for either said movement means or said generating means, as required;

a dictator station, said dictator station having tone generating control adjuncts;

means for interconnecting said dictator station and said recording unit for customary operations;

means in said recording unit responsive to generated tone signals to initiate operations required;

means for recording tones generated on said media during operation;

tone elimination means for effecting relative reversal of said media and erasure of a recorded tone; and means for inhibiting operation of said relative movement means until termination of said tone elimination operation.

2. A control arrangement for a telecommunication dictation system, comprising:

a recording unit with provision for accommodating record media and having a transducer;

means for effecting relative movement between said media and said transducer as a particular cyclical rate;

means for generating advisory signals at said cyclical rate;

common cyclical control means for establishing said cyclical rate for either said movement means or said generating means, as required;

a dictator station, said dictator station having tone generating control adjuncts;

means for interconnecting said dictator station and said recording unit for customary operations;

means in said recording unit responsive to generated tone signals to initiate operations required; and means operable upon detection of certain conditions, such as completion of a media change operation to operate said relative movement means forwardly at least one step in order to establish an initial margin area on the media to insure receiving all of the material dictated.

3. A control arrangement for a telecommunication dictation system, comprising:

a recording unit with provision for accommodating record media and having a transducer;

means for effecting relative movement between said media and said transducer as a particular cyclical rate;

means for generating advisory signals at said cyclical rate;

common cyclical control means for establishing said cyclical rate for either said movement means or said generating means, as required;

a dictator station;

means for interconnecting said dictator station and said recording unit for customary operations; and means for providing said advisory signals under at least one of the following conditions:

(a) Stop mode, recording unit ready for dictation, (b) Disconnect, (c) Record mode, talk-down tone.

4. The apparatus of claim 3, wherein:

said cyclical control means is operable at at least two predetermined cyclical rates; and further comprising means responsive to signals indicative of conditions (a), (b) and (c) to operate said control means at one rate and further responsive to (d) on end of media condition to operate said cyclical means at a different rate.

5. The apparatus of claim 4, wherein: advisory signals for conditions (a), (b), and (c) are at a relatively lower rate while advisory signals for condition (d) is at a relatively higher rate.

6. A control system, comprising:

a recording unit with provision for accommodating a record media and having a transducer;

first means responsive to pulses at a particular cyclical rate for effecting relative movement between said media and said transducer at said particular cyclical rate;

second means also responsive to pulses at said particular cyclical rate for generating advisory signals at said cyclical rate;

common cyclical control means operable in one mode to provide pulses at said cyclical rate to said movement means and operable in another mode to provide pulses at said cyclical rate to said generating means on a selective basis;

and mode control means for establishing said one or another mode of said common cyclical control means.

7. The system of claim 6, further comprising: means interconnected with said relative movement means for relatively moving said media and said transducer in forward and reverse directions on a selective basis.

8. The apparatus of claim 7, wherein: said relative movement means comprises incremental stepping mechanism for moving said transducer predetermined increments in forward and reverse directions relative to said media.

9. The system of claim 7, further comprising: control adjuncts for selecting the direction of relative movement.

10. The apparatus of claim 6, further comprising:

at least one dictator station;

means for interconnecting said dictator station and said recording unit for customary dictation operations;

control adjuncts operable at said dictator station to initiate operations required including relative movement of said media and said transducer;

and means associated with said recording unit for activating said mode control means to said one mode to initiate operation of said relative movement means when the related control adjunct is operated.

11. The system of claim 10 further comprising: means for maintaining said cyclical relative movement so long as a related control adjunct at said station is operated.

12. The apparatus of claim 5, further comprising:

means in said recording unit for relatively moving said media and said transducer in forward and reverse directions under control of said common cyclical control means; and control adjuncts at said dictator station for initiating operation of said relative moving means in said forward and reverse directions and for concurrently activating said mode control means to said one state.

13. The system of claim 12, further comprising:

means at said dictator station for generating forward and reverse tone combinations responsive to activation of the related control adjuncts; and means in said recording unit responsive to said tone combinations to initiate relative movement in forward and reverse directions, respectively.

14. The system of claim 13, further comprising:

means in said recording unit for establishing at least a Record mode for dictation and a Playback mode for listening.

means for initiating reverse and forward movement operations accompanied by establishment of a Playback mode if the system was previously in a Record mode; and a letter lock contact that is movable upon termination of dictation in a Record mode to indicate the end of one dictation interval and the beginning of the next interval on said media and that serves to inhibit reverse relative movement.

15. The system of claim 13, further comprising:
letter end lockout means for inhibiting reverse relative movement when a letter boundary is encountered; and
advance marker means for inhibiting forward relative movement at the end of dictated material.

16. The system of claim 15, further comprising: means automatically operative when a hangup condition is recognized to operate said relative movement means in the forward direction until said advance marker means is encountered.

17. The system of claim 13, further comprising:
additional control adjuncts at said dictator station for generating tone signals; and
means in said recording unit responsive to generated tone signals from said station to initiate additional operations required.

18. The system of claim 17, further comprising: means for performing an interconnecting operation in response to permuted tone combinations.

References Cited

UNITED STATES PATENTS

| | | | |
|---|---|---|---|
| 3,226,700 | 12/1965 | Miller | 179—100.2 |
| 3,381,276 | 4/1968 | James | 179—2 |

FOREIGN PATENTS

| | | |
|---|---|---|
| 914,069 | 12/1962 | Great Britain. |
| 936,814 | 9/1963 | Great Britain. |

STANLEY M. URYNOWICZ, Jr., Primary Examiner

J. ROSENBLATT, Assistant Examiner

U.S. Cl. X.R.

179—100.1